US007102861B2

(12) United States Patent
Cave et al.

(10) Patent No.: US 7,102,861 B2
(45) Date of Patent: Sep. 5, 2006

(54) CRYOGENIC CURRENT LIMITING FUSE

(75) Inventors: Julian Cave, St-Bruno-de-Montarville (CA); André Hamel, Beloeil (CA); Vijay Sood, Brossard (CA); Dan Watson, Montreal (CA); Wen Zhu, Brossard (CA)

(73) Assignee: Hydro Quebec, Montreal (CA)

( * ) Notice: Subject to any disclaimer, the term of this patent is extended or adjusted under 35 U.S.C. 154(b) by 290 days.

(21) Appl. No.: 10/748,437

(22) Filed: Dec. 31, 2003

(65) Prior Publication Data

US 2005/0146817 A1 Jul. 7, 2005

(51) Int. Cl.
*H02H 7/00* (2006.01)
*H01H 85/04* (2006.01)

(52) U.S. Cl. .................................... 361/19; 337/162

(58) Field of Classification Search .................. 361/19; 337/162

See application file for complete search history.

(56) References Cited

U.S. PATENT DOCUMENTS

| | | | | |
|---|---|---|---|---|
| 4,488,137 | A | 12/1984 | Rooney et al. | 337/162 |
| 5,153,803 | A * | 10/1992 | Rapeaux et al. | 361/19 |
| 5,600,522 | A | 2/1997 | Hull | 361/19 |
| 5,986,536 | A * | 11/1999 | Ries et al. | 338/13 |
| 6,043,731 | A * | 3/2000 | McDougall et al. | 338/32 S |
| 6,762,673 | B1 * | 7/2004 | Otto et al. | 338/32 S |

FOREIGN PATENT DOCUMENTS

| | | | | |
|---|---|---|---|---|
| JP | 401039230 | * | 2/1989 | 361/19 |

* cited by examiner

*Primary Examiner*—Phuong T. Vu
*Assistant Examiner*—Scott Bauer
(74) *Attorney, Agent, or Firm*—Ogilvy Renault LLP

(57) ABSTRACT

A cryogenic current limiting fuse is disclosed together with a method of manufacturing a cryogenic current limiting fuse, the cryogenic current limiting fuse comprising a first cryogenic composite and a second cryogenic composite wherein at least one of the first and the second cryogenic composites has a non-linear and increasing resistivity with respect to at least one of temperature and current.

24 Claims, 12 Drawing Sheets

CRYOGENIC CURRENT LIMITING FUSE

CROSS-REFERENCE TO RELATED APPLICATIONS

This is the first application filed for the present invention.

TECHNICAL FIELD

This invention relates to the field of current limiting fuses. More precisely, this invention pertains to the field of cryogenic fuses.

BACKGROUND OF THE INVENTION

Current limiting fuses have been employed in power networks for many years and the basic technology is fairly old. However, due to the large ratio, approximately two orders of magnitude, of limited current to nominal current, their use is restricted to low values of nominal currents, typically under 200 Amperes.

One of the most basic designs of a passive current limiting fuse requires a multitude of arcs to be created after the melting of series of constrictions along a thin ribbon of metal such as silver. This multitude of arcs withstands the voltage of the network in which the fuse is inserted and auto-extinguishes in a fraction of a cycle.

This auto-extinction is usually achieved by embedding the element in a highly compacted sand or quartz powder.

In normal operating conditions, the melting point of constrictions, as the AC current is very slowly increased, determines the maximum nominal operating current. In fault conditions however, the current rises very quickly above the nominal value and when it is high enough to have provided sufficient energy to heat the constrictions to a high temperature, it will cause them to melt. This increases their resistance and initiates the series of arcs that complete the action of the fuse.

Advantages are that such fuses are fail safe, silent and passive, no external triggering is required. The main disadvantage is that the resistivity of the metals used, for instance silver, does not increase rapidly with temperature. This leads to large ratios of peak limited current to maximum nominal current and high let-through energies.

Recent developments, to increase the range of nominal currents for the application of fuses to power networks, have led to active fuses that are triggered by an explosion in a high nominal current element in parallel with a more conventional fuse element that is used to deviate the current from the high nominal current element whilst its explosion and extinction occurs.

Subsequently, this more conventional element operates in the usual manner to completely interrupt the fault current. In this way, the operating maximum nominal current may be increased without duly increasing the peak limiting current and the let-through energy. However, disadvantages are that the action is active, and as non-operation may cause considerable damage, this type of fuse requires a very reliable triggering system. Moreover, often the explosive charge has to be renewed periodically, and the fuse operation may also cause a loud noise.

In view of the above, there is a need for a method and apparatus that will overcome the above-identified drawbacks.

SUMMARY OF THE INVENTION

It is an object of the invention to provide a current limiting fuse having a low, approximately one order of magnitude, peak limited current to peak nominal current ratio.

It is another object of the invention to provide a passive current limiting arcing and auto-extinguishing fusible module, subsequently called the fusible module, for use in a current limiting fuse having a low peak limited current to peak nominal current ratio.

Yet another object of the invention is to provide a method for manufacturing a fuse having a low peak limited current to peak nominal current ratio.

According to a first aspect of the invention, there is provided a current limiting fusible module, for use in a cryogenic fuse, the fusible module being adapted to initiate a current limiting arc, the fusible module comprising a first cryogenic composite, a second cryogenic composite, adjacent to the first cryogenic composite and wherein at least one of the first and the second cryogenic composites has a non-linear and substantially increasing resistivity with respect to increasing at least one of temperature and current, further wherein one of the first and second cryogenic composites having the highest resistance, at high temperatures and/or currents, will depart from its solid state thereby initiating the current limiting arc.

According to a second aspect of the invention, there is provided a method for manufacturing a cryogenic fuse, comprising creating a plurality of current limiting fusible modules, each one of the plurality of current limiting fusible modules being adapted to initiate a current limiting arc, the current limiting fusible module comprising a first cryogenic composite and a second cryogenic composite adjacent to the first cryogenic composite, wherein at least one of the first and the second cryogenic composites has a non-linear and substantially increasing resistivity with respect to increasing at least one of temperature and current, further wherein one of the first and second cryogenic composites having the highest resistance, at high temperatures and/or currents, will depart from its solid state thereby initiating said current limiting arc, creating at least one fusible assembly, each of the at least one fusible assembly being created by placing at least two of the plurality of current limiting fusible modules serially according to a desired power network nominal voltage, creating a fusible element, the creating comprising assembling the at least one fusible assembly of the created at least one fusible assembly in parallel according to a desired power network nominal current and incorporating the fusible element in a casing comprising an arc-extinguishing medium and means for cryogenic cooling thereby creating the cryogenic fuse.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

Figure 1:
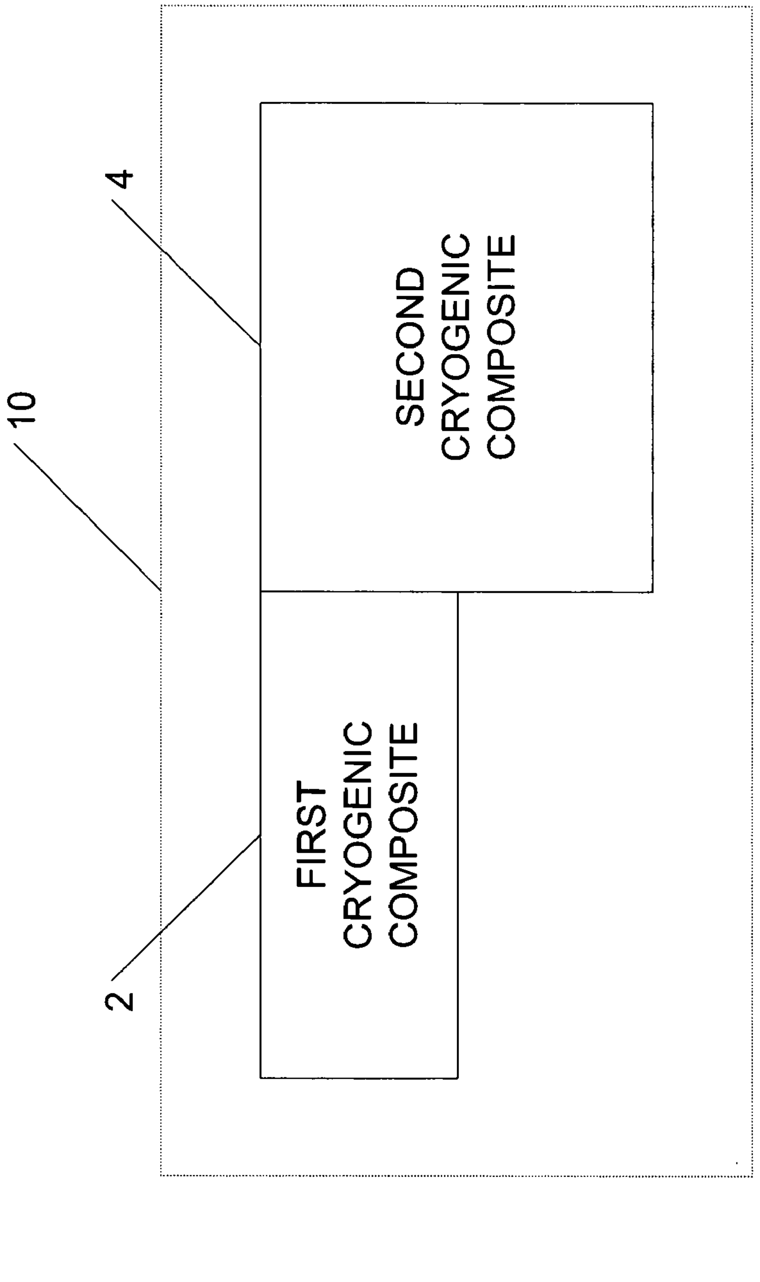
FIG. 1 is a block diagram which shows a first embodiment of a current limiting fusible module.

Now referring to FIG. 1, there is shown a first embodiment of a current limiting fusible module 10.

The current limiting fusible module 10 comprises a first cryogenic composite 2 and a second cryogenic composite 4.

In the preferred embodiment of the invention, the first cryogenic composite 2 comprises at least one of a superconducting material, a metallic element and a metallic alloy.

Still in the preferred embodiment of the invention, the second cryogenic composite 4 comprises at least one of a superconducting material, a metallic element and a metallic alloy.

It will be appreciated that the first cryogenic composite 2 and the second cryogenic composite 4 have a low resistance at cryogenic temperatures. However, it will be appreciated that the first cryogenic composite 2 and the second cryogenic composite 4 are chosen in order to exhibit different resistance characteristics at high temperatures and high currents which then create one self-extinguishing current limiting arc segment in the composite with the highest resistance, in the conditions prescribed for the action of the fuse.

For instance, the first cryogenic composite 2 and the second cryogenic composite 4 may be any of superconducting materials such as high temperature superconducting ceramics YBaCuO, BiSrCaCuO and (BiPb) SrCaCuO; metallic elements such as silver, gold, copper, lead, tin, indium, aluminium and nickel and metallic alloys such as silver-gold, silver-magnesium, high temperature nickel-alloys and iron alloys and solder alloys lead-tin etc.

It will be appreciated that at least one of the first cryogenic composite 2 and the second cryogenic composite 4 has a non-linear and substantially increasing resistivity with respect to at least one of temperature and current. The skilled addressee will therefore appreciate that a careful consideration of the comprising materials, their relative percentages and geometrical disposition has to be made in order to achieve such condition. It will be appreciated by the skilled adressee that in order to assure auto-extinction of an initiated arc, the required dimensions of the composites should assure a sufficient length, in the direction of the current, of the non-arc initiating composite and a sufficiently small enough volume of each composite in order not to propagate the arc to adjacent regions. In addition, the fusible module should be contained in an arc-extinguishing environment or medium such as compacted sand or quartz.

Nominal current is defined as a current value for which a fuse is required to protect a device while operating continuously without melting, usually as an root mean square (RMS) value.

A peak limited current is defined as a current value indicating the highest absolute current which continues to flow in a device during the action of the fuse.

A let-through energy factor is defined as the integral of the instantaneous current squared with respect to time from an occurrence of the fault and until the completed action of the fuse.

Figure 2:
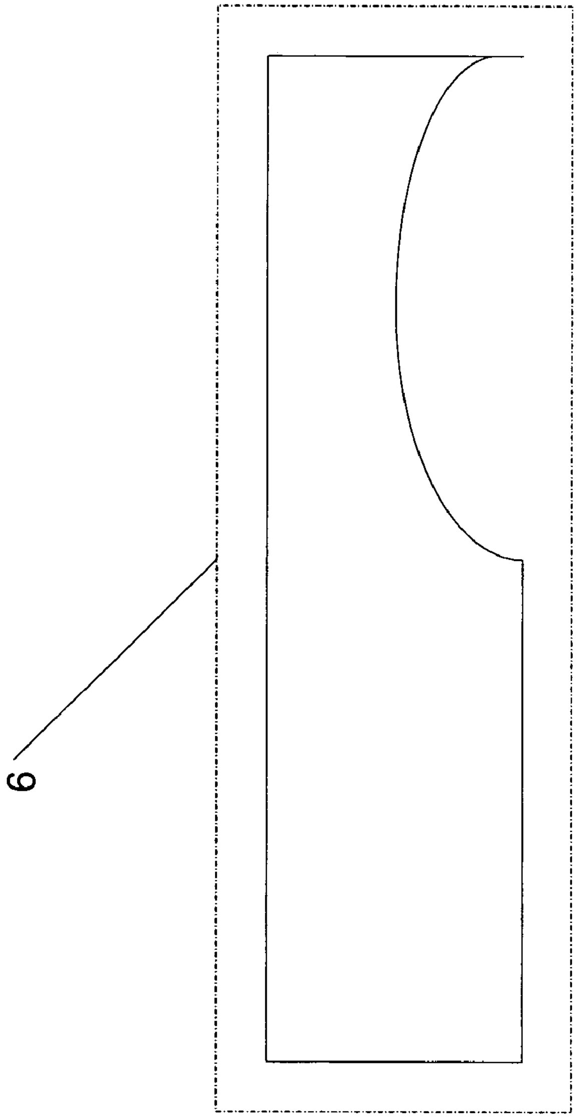
FIG. 2 is a schematic which shows a cryogenic heat dissipator.

Now referring to FIG. 2, there is shown a cryogenic heat dissipator 6. The cryogenic heat dissipator 6 is typically used for efficiently dissipating the heat to a cryogenic cooling medium for current values up to, and including, the nominal current whilst not interfering significantly with the arc initiation and extinction characteristics of the fuse. The cryogenic heat dissipator 6 has a shape adapted to dissipate the heat and is typically made of high conductivity metals such as silver, copper and aluminium. For example, this material can be in the form of an expanded mesh to increase its effective surface area and reduced in width when passing under the arc initiating cryogenic composite.

Figure 3:
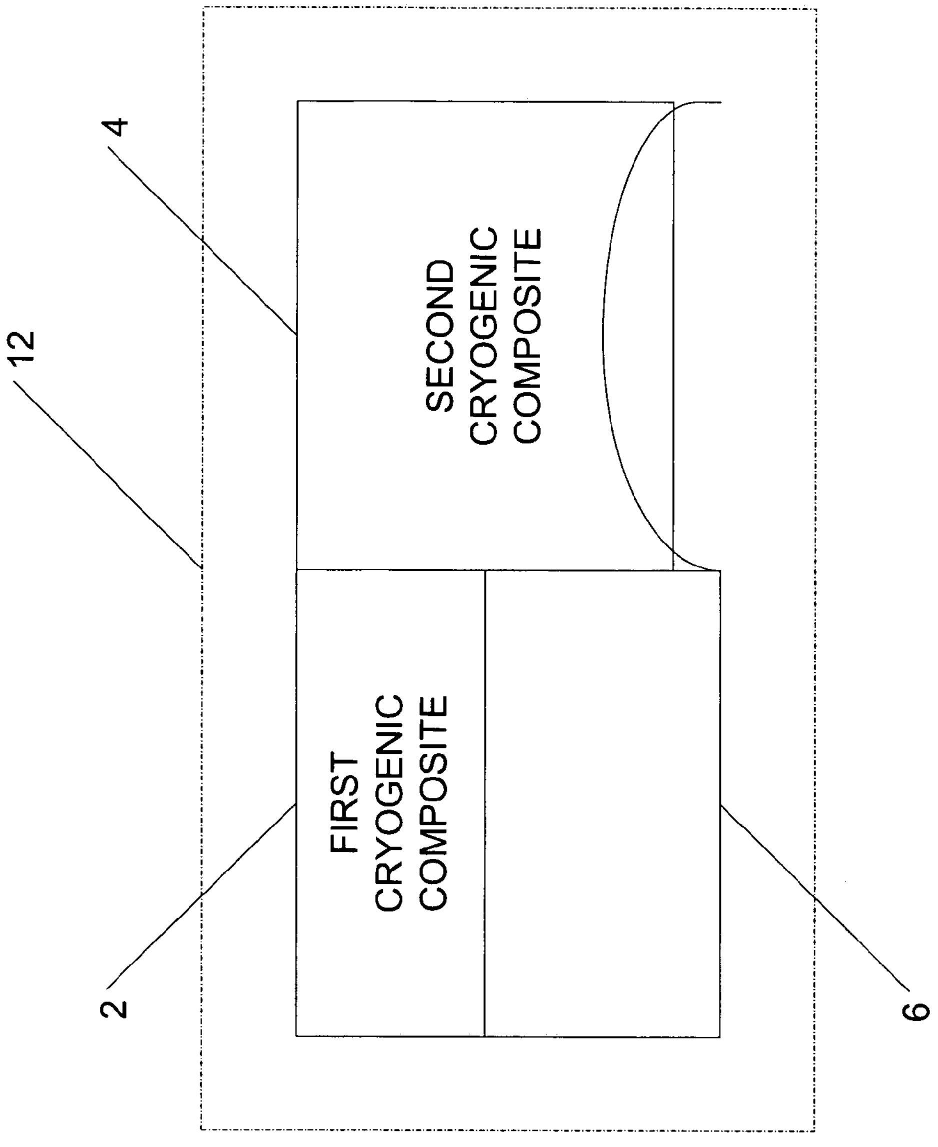
FIG. 3 is a schematic which shows a second embodiment of a current limiting fusible module which comprises a cryogenic heat dissipator.

Now referring to FIG. 3, there is shown a second embodiment of a current limiting fusible module 12.

In this second embodiment, the current limiting arc fusible module 12 comprises the first superconducting composite 2, the second superconducting composite 4 and the cryogenic heat dissipator 6 disclosed in FIG. 2.

The second embodiment of the current limiting fusible module 12 is preferably used in the case where an increase in nominal current is required at the expense of additional cooling cost. Such a case may be for power networks where, for short periods of time, it is required to allow higher than nominal values, for example during cold load pick-up after a power outage.

Figure 4:
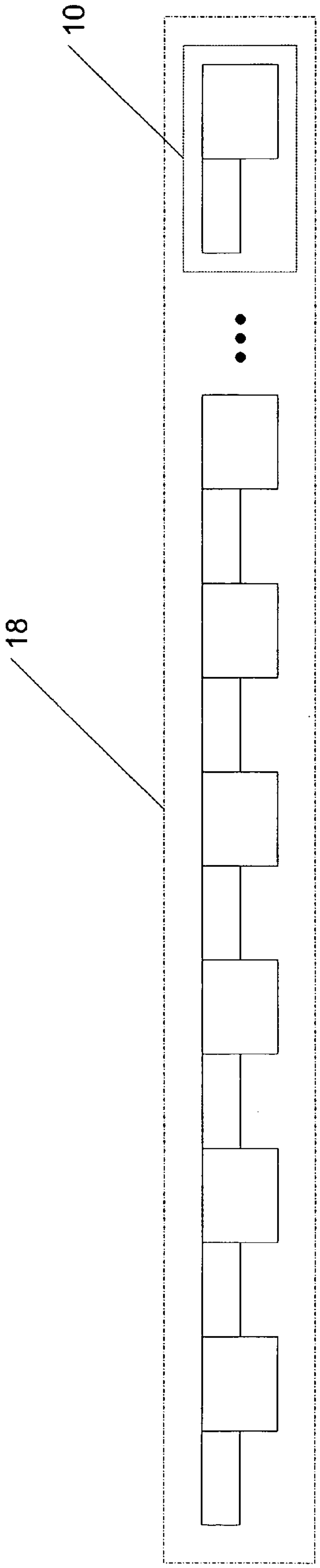
FIG. 4 is a schematic which shows a first embodiment of a fusible element comprising a plurality of current limiting fusible modules in series.

Now referring to FIG. 4, there is shown a first embodiment of a fusible element 18.

The first embodiment of the fusible element 18 comprises a plurality of current limiting fusible modules 10 which are serially disposed with respect to the application of a current.

It will be appreciated that the first embodiment of the fusible element 18 is created according to a desired network voltage during current limiting fuse operation.

The skilled addressee will appreciate that a large number of current limiting fusible modules 10 are used in the case where a large network voltage is desired, while a smaller number of current limiting fusible modules 10 are used in the case where a small network voltage is desired. For distribution network voltages a hundred or so modules in series would be required.

It will be appreciated that the plurality of current limiting fusible modules 10 that are serially disposed may be achieved by a variety of materials fabrication techniques and assembly methods.

Figure 5:
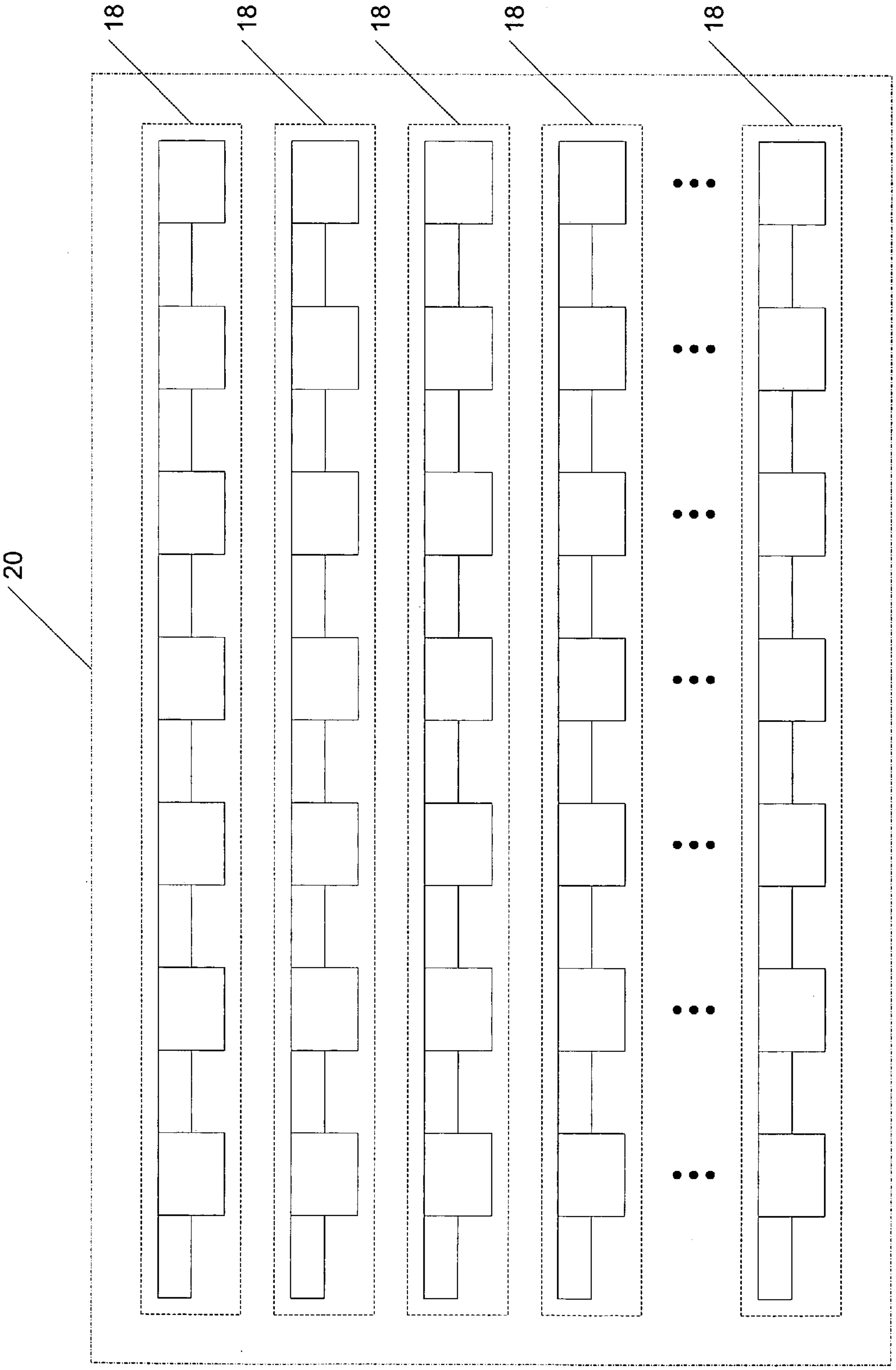
FIG. 5 is a schematic which shows a first embodiment of a cryogenic current limiting fuse; the cryogenic current limiting fuse comprises a plurality of fusible elements in parallel.

Now referring to FIG. 5, there is shown a simplified view of a first embodiment of a cryogenic current limiting fuse 20. The cryogenic current limiting fuse 20 comprises, inter alia, a plurality of fusible elements 18.

The plurality of fusible elements 18 are disposed in parallel with respect to the application of a current.

It will be appreciated that the plurality of fusible elements 18 are disposed in parallel according to a desired network nominal current.

The skilled addressee will appreciate that a large number of current limiting fusible modules 10 are used in parallel in the case where a large network nominal current is desired, while a small number of current limiting fusible modules 10 are used in parallel in the case where a small network nominal current is desired.

Figure 8A:
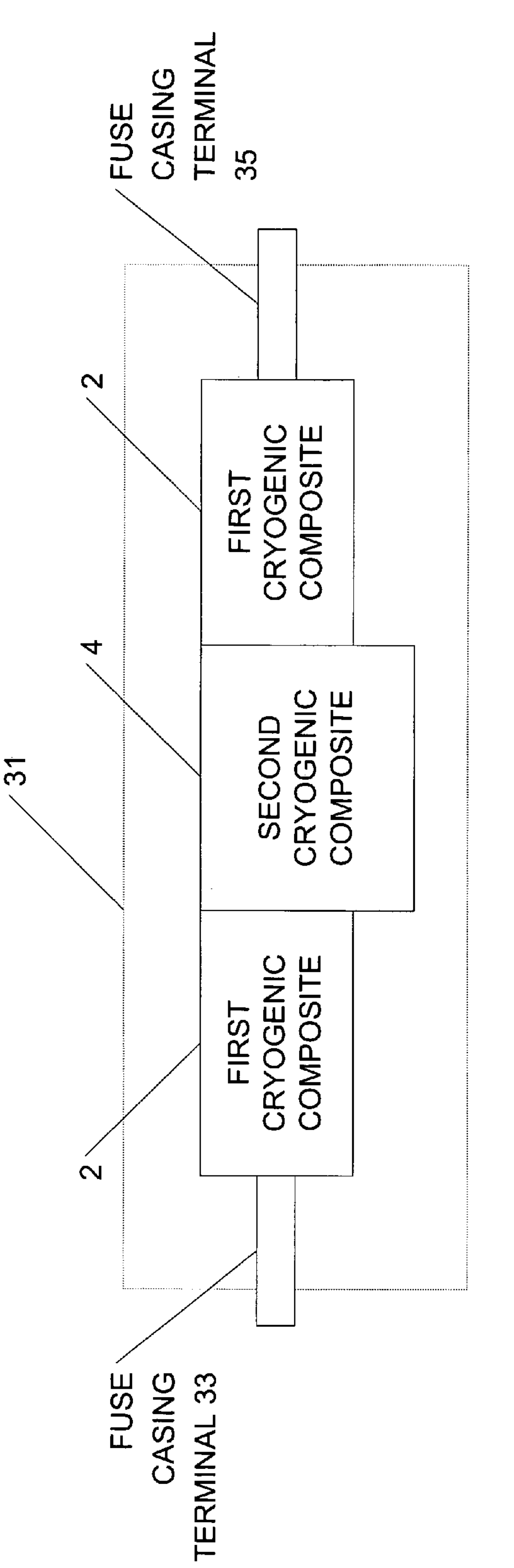
FIG. 8*a* is a schematic which shows another embodiment of a cryogenic current limiting fuse comprising a single current limiting fusible module.

In an alternative embodiment, shown in FIG. 8*a*, a cryogenic current limiting fuse 31 comprises a single current limiting fusible module.

It will be appreciated by the skilled addressee that preferably the first cryogenic composite 2 is secured, in this embodiment, to a first end of the second cryogenic composite 4 and to a fuse casing terminal 33 while a second first cryogenic composite 2 is second a second end of the second cryogenic composite and to a second fuse casing terminal 35.

In this embodiment, the first cryogenic composite and the second cryogenic composite are selected so that the second cryogenic composite 4 exhibits the greatest resistance in fault conditions.

In one embodiment, the first cryogenic composite 2 is a superconducting multifilament wire, e.g. BiPbSrCaCuO with silver sheath or silver alloy sheath, while the second cryogenic composite 4 is a thin pure silver ribbon or expanded mesh.

In another embodiment, the first cryogenic composite 2 is a pure silver ribbon or expanded mesh while the second cryogenic composite 4 is a YBaCuO (123) thin film high critical current density superconductor on a high withstand voltage substrate.

In another alternative, the first cryogenic composite 2 is a superconducting multifilament wire, e.g. BiPbSrCaCuO (2223) with silver sheath or silver alloy sheath while the second cryogenic composite 4 is a superconducting bulk material e.g. BiSrCaCuO (2212) with optional metal and/or alloy and/or ceramic additions for strength and current carrying performance.

Figure 6:
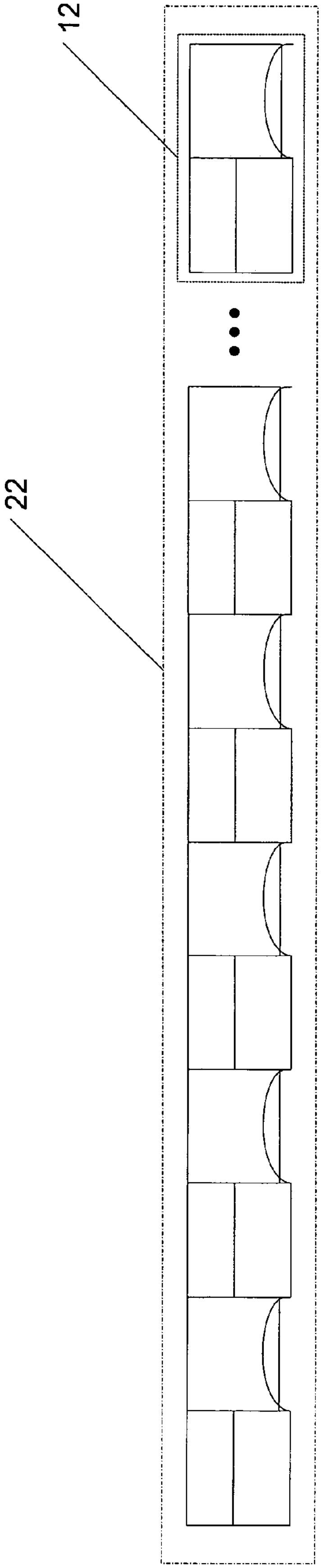
FIG. 6 is a schematic which shows a second embodiment of a fusible element comprising a plurality of current limiting arc fusible modules; in this embodiment each current limiting fusible module comprises a cryogenic heat dissipator.

Now referring to FIG. 6, there is shown a schematic which discloses a second embodiment of a fusible element 22.

In this embodiment, the fusible element 22 comprises a plurality of current limiting fusible modules 12 comprising a heat dissipator.

It will be appreciated that the second embodiment of the fusible element 22 is created according to a desired network voltage during current limiting fuse operation.

It will be appreciated that the plurality of current limiting fusible modules 12 that are serially disposed may be achieved using a variety of materials fabrication techniques and assembly methods, as described below.

Figure 7:
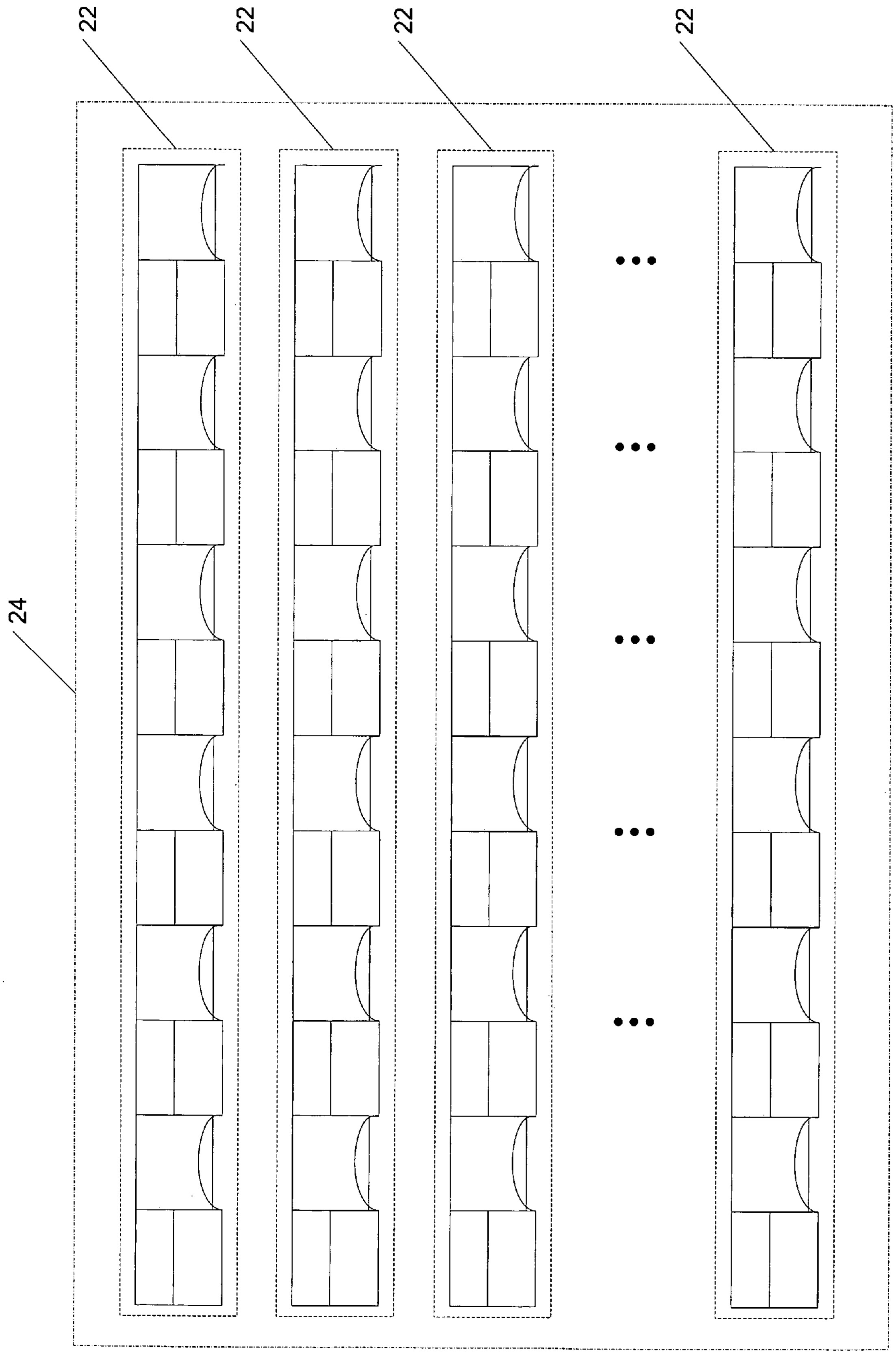
FIG. 7 is a schematic which shows a second embodiment of a cryogenic current limiting fuse; the cryogenic current limiting fuse comprises a plurality of fusible elements in parallel.

Now referring to FIG. 7, there is shown a simplified view of a second embodiment of a cryogenic fuse 24.

The cryogenic fuse 24 comprises, inter alia, a plurality of fusible elements 22. The plurality of fusible elements 22 are disposed in parallel with respect to the application of the network current.

It will be appreciated that the plurality of fusible elements 22 are disposed in parallel according to a desired network nominal current.

In the case of the cryogenic fuse 20, the plurality of fusible elements 18 comprised in the cryogenic fuse 20 may be wound on a substrate adapted to withstand a high voltage thereby creating a fuse. The substrate may be any one of mica, magnesia and other high temperature ceramics. The plurality of fusible elements 18 may be wound according to various geometric shape embodiments in order to respect specified overall fuse dimensions. In the preferred embodiment, the plurality of fusible elements 18 is wound in spiral.

Figure 8B:
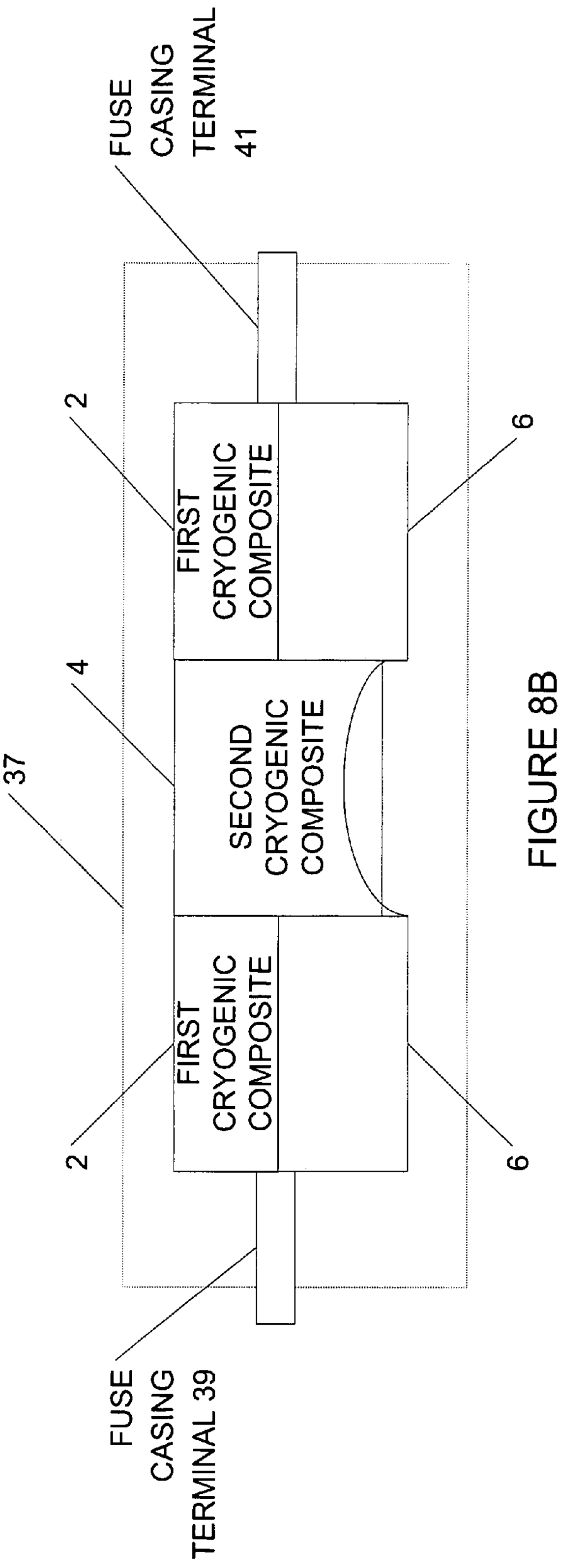
FIG. 8*b* is a schematic which shows another embodiment of a cryogenic current limiting fuse comprising a single current limiting fusible module and a cryogenic heat dissipater.

Now referring to FIG. 8*b*, there is shown a cryogenic current limiting fuse 37 which comprises a single current limiting fusible module 12.

It will be appreciated by the skilled addressee that preferably the first cryogenic composite 2 is secured, in this embodiment, to a first end of the second cryogenic composite 4 and to a fuse casing terminal 39 while a second first cryogenic composite 2 is second a second end of the second cryogenic composite and to a second fuse casing terminal 41.

In this embodiment, the first cryogenic composite and the second cryogenic composite are selected so that the second cryogenic composite 4 exhibits the greatest resistance in fault conditions. A heat dissipater 6 is further used.

Figure 9:
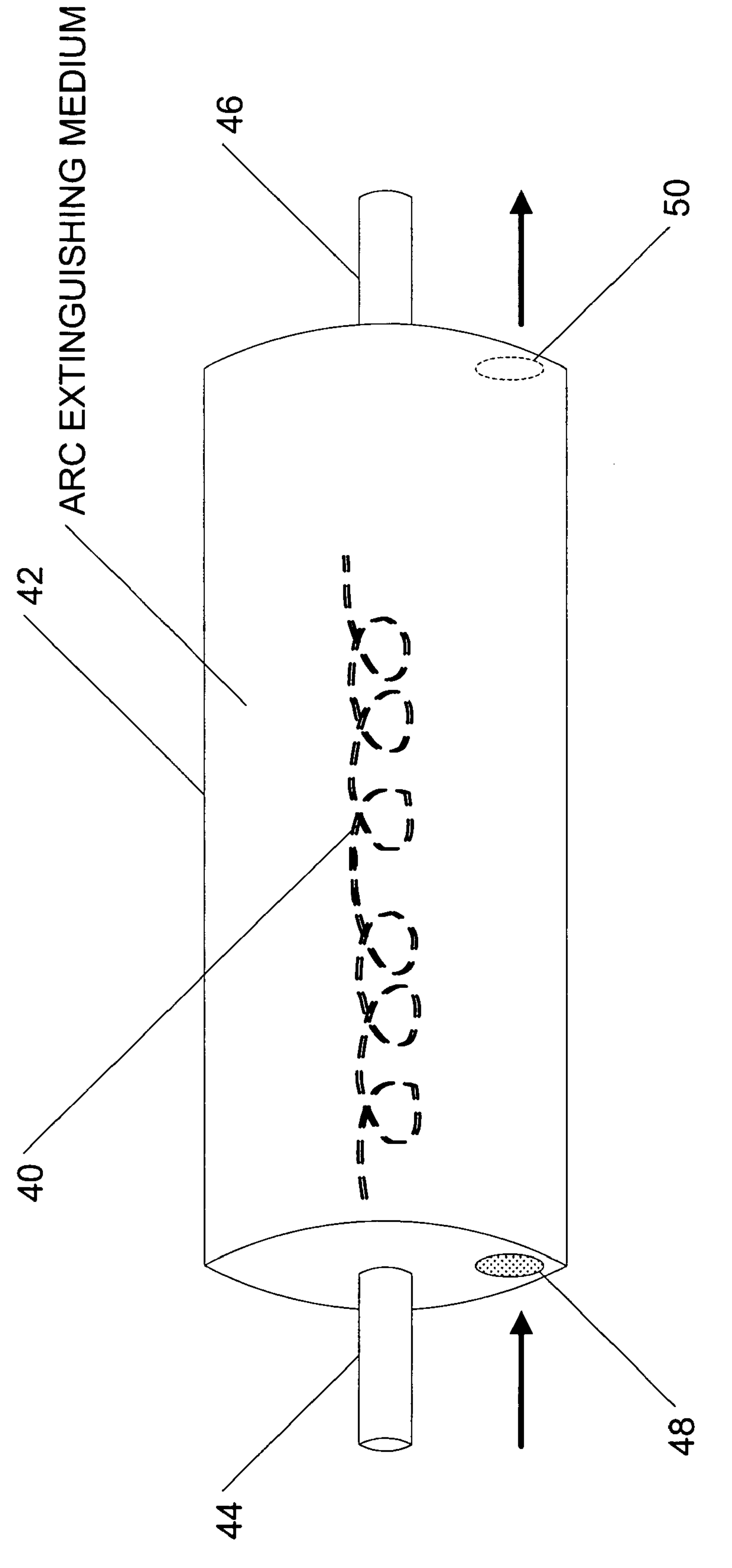
FIG. 9 is a three-dimensional view of a first example of a cryogenic current limiting fuse according to the invention.

Now referring to FIG. 9 there is shown an example of the cryogenic fuse 20 according to one embodiment.

In this embodiment, the cryogenic fuse 20 comprises a casing 42 having a cylindrical shape. The casing 42 is preferably made of glass fiber or other suitable electrical cryogenic insulator. The casing 42 is adapted to receive the plurality of fusible elements 18 wound up in spiral 40. The casing is further adapted to receive a cryogenic liquid, for example, liquid nitrogen maintained at a temperature of substantially 77 kelvin.

It will further be appreciated that the casing 42 comprises an inlet access port 48 and an outlet access port 50 adapted for respectively receiving and exiting liquid nitrogen thereby creating a circulation of liquid nitrogen in the casing 42 and further maintaining the plurality of fusible elements 18 at a cryogenic temperature.

Preferably, compacted sand or quartz is used in the casing 42 and the inlet access port 48 and the outlet access port 50 comprise a filter to assure sand or quartz retention.

A first metal cap 44 and a second metal cap 46 are located respectively at each end of the casing 42 of the cryogenic fuse 20.

The first and the second metal caps enable an electrical connection between the fuse and a circuit in which the fuse 20 is used. Preferably, the first and the second metal caps are made of a good conductivity metal such as copper, which may be nickel plated and/or tinned.

The plurality of fusible elements 18 wound up in spiral 40 are connected to the first metal cap 44 and to the second metal cap 46.

It will be appreciated that the second embodiment of cryogenic fuse 24 may be similar to the embodiment disclosed in FIG. 9.

Figure 10:
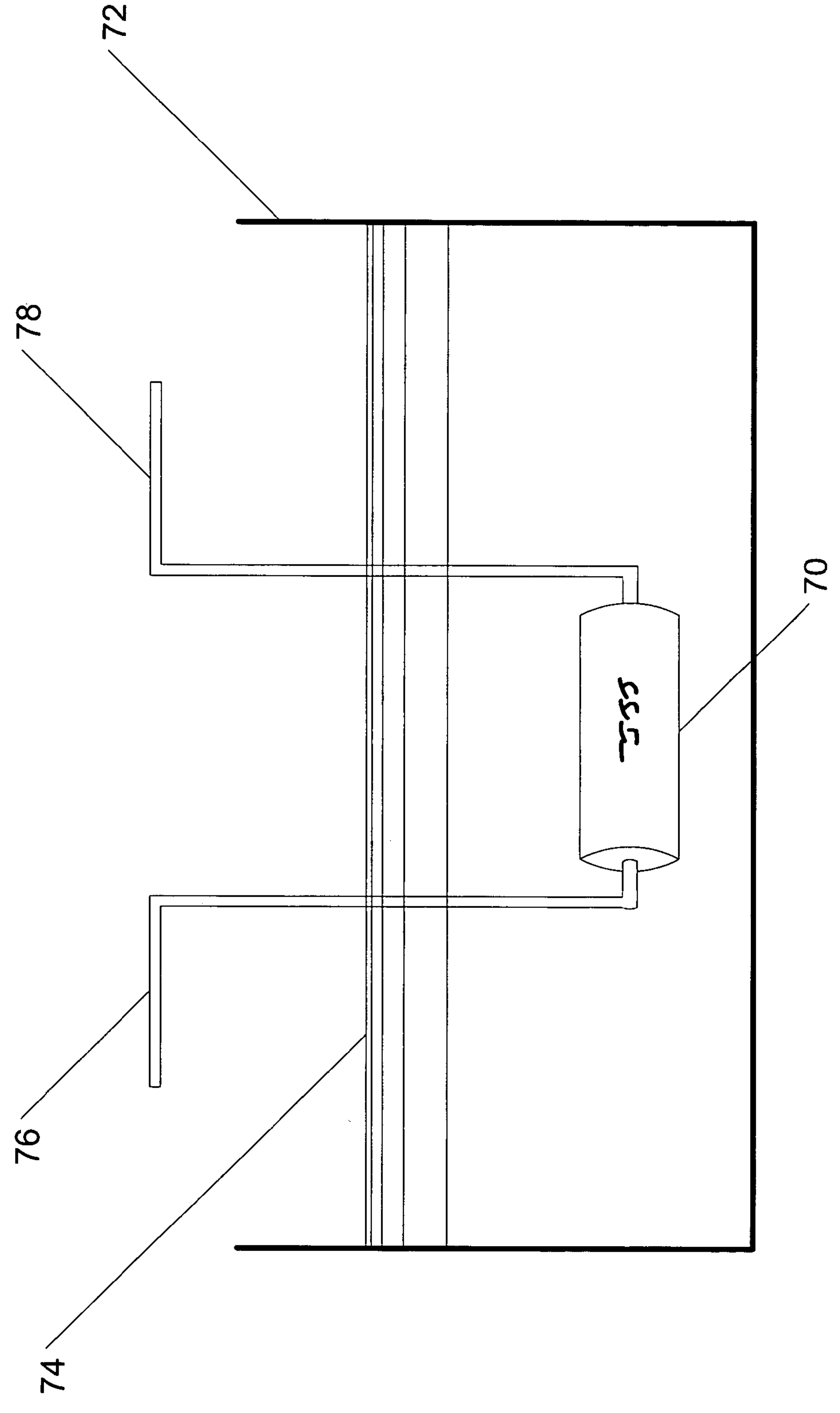
FIG. 10 is a front view of a second example of a cryogenic current limiting fuse according to the invention in which the fuse is bathed in a cryogenic cooling liquid such as liquid nitrogen.

Now referring to FIG. 10, there is another example of the cryogenic fuse 20 according to one embodiment.

In this embodiment, the cryogenic fuse 20 comprises a casing 72 adapted to receive the plurality of fusible elements 18. Still in this embodiment, the plurality of fusible elements 18 are immersed in a cryogenic liquid 74 thereby maintaining the plurality of fusible elements 18 at a cryogenic temperature. Preferably, the cryogenic liquid is liquid nitrogen.

A first electrode 76 and a second electrode 78 are electrically connected to the plurality of fusible elements 18 located in a casing 70 and enable an electrical connection between the cryogenic fuse 20 and a circuit for which the cryogenic fuse 20 is used. The casing 72 is preferably made of glass fiber or other suitable electrical cryogenic insulator.

It will be appreciated that the second embodiment of cryogenic fuse 24 may be similar to the embodiment disclosed in FIG. 10.

Figure 11:
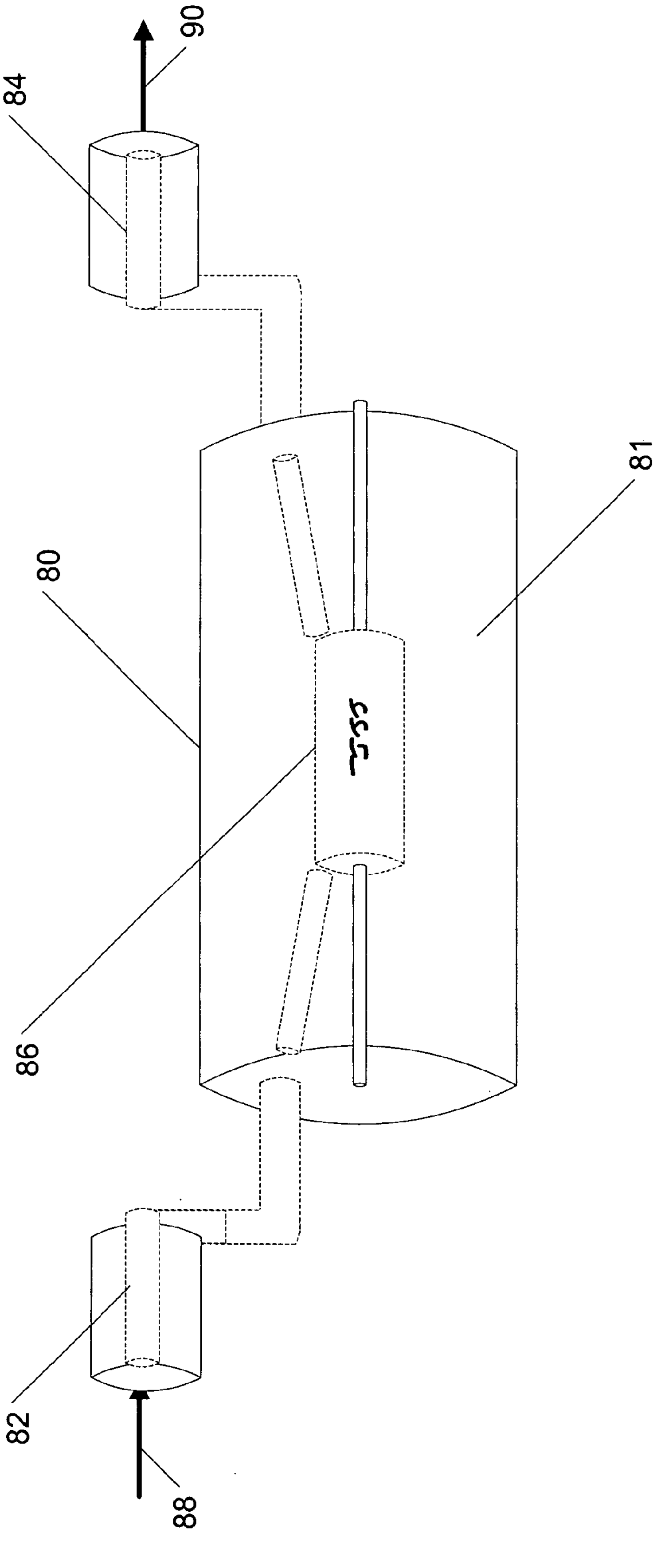
FIG. 11 is a three-dimensional view of a third example of a cryogenic current limiting fuse according to the invention in which the fuse is encased in insulation and has cryogenic cooling feed and return tubes.

Now referring to FIG. 11, there is a third example of the cryogenic fuse 20 according to another embodiment.

In this embodiment, the cryogenic fuse 20 comprises a casing 80. The casing has preferably a cylindrical shape.

The casing 80 is adapted to receive the plurality of fusible elements 18 located in an inner protection casing 86. Still in this embodiment, the casing 80 comprises a cryogenic insulator 81, for example a non-flammable foam. A cryogenic liquid is circulating in the casing in the surrounding of the plurality of fusible elements 18 thereby maintaining the plurality of fusible elements 18 at a cryogenic temperature. Preferably, the cryogenic liquid is liquid nitrogen.

The casing 80 further comprises an inlet access port 82 and an outlet access port 84 enabling input of the cryogenic liquid 88 and output of the cryogenic liquid 90 thereby enabling the circulating of the cryogenic liquid. The inlet access port 82 and the outlet access port 84 are preferably insulated. A cryogenic gas, such as precooled helium gas, may also be used as the cryogenic cooling medium.

Figure 12:
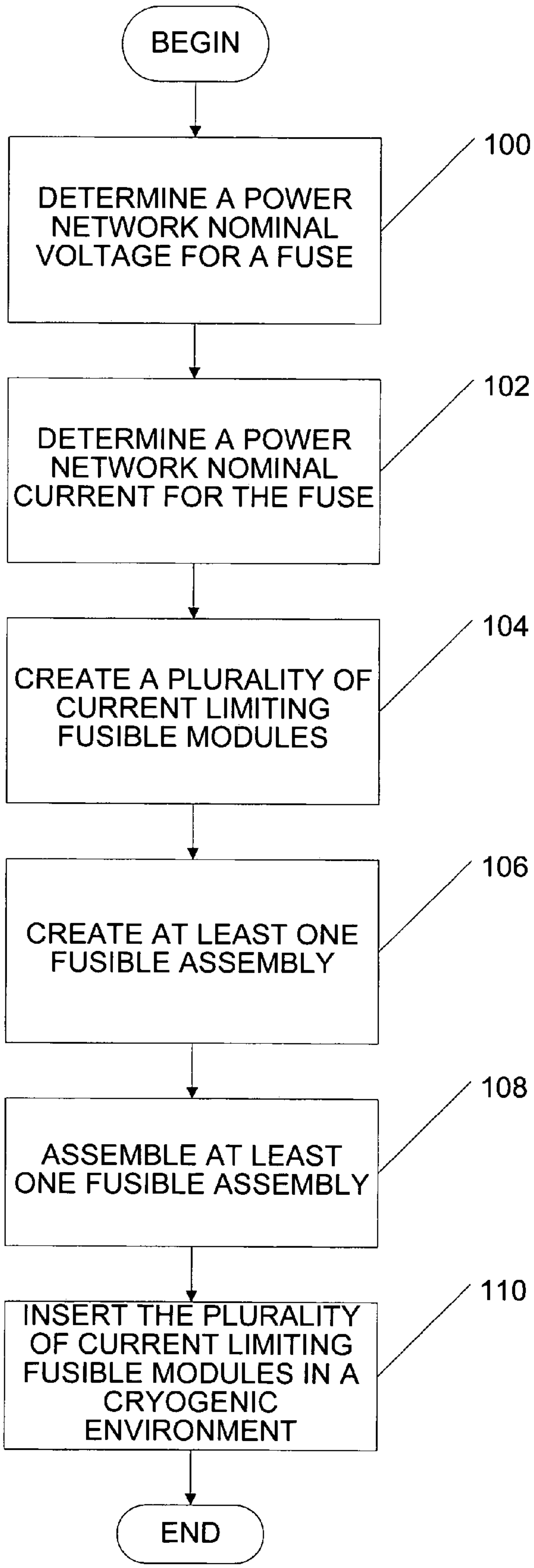
FIG. 12 is a flowchart which shows how to manufacture a cryogenic current limiting fuse according to the preferred embodiment of the invention.

Now referring to FIG. 12, there is shown a flow chart disclosing how to manufacture a fuse according to the preferred embodiment of the invention.

According to step 100, a power network nominal voltage for the fuse to be manufactured is determined.

According to step 102, a power network nominal current for the fuse to be manufactured is determined.

According to step 104, a plurality of current limiting fusible modules are created. The plurality of current limiting fusible modules may be either one of the fusible element 10 and the fusible element 12. According to step 106, at least one fusible assembly is created. The fusible assembly may be either one of the fusible assembly 18 and the fusible assembly 22. Each of the at least one fusible assembly is created according to the determined power network nominal voltage for the fuse. The number of fusible modules, typically a hundred or so for a distribution network, in each assembly is being determined by the network nominal voltage and fault voltage characteristics.

According to step 108, at least one of the fusible assemblies is assembled. In the case where more than one fusible assembly is assembled, the at least two fusible assemblies are assembled in parallel. The number of fusible assemblies, typically under ten for a distribution network, to be assembled in parallel is based on the determined power network nominal current and over-current characteristics.

According to step 110, the assembled at least one fusible assembly is inserted in a cryogenic environment thereby maintaining the assembled at least one fusible assembly at a specified cryogenic temperature. The assembled at least one fusible assembly is inserted in a cryogenic environment (aka, cooling medium) which may be one of a cryogenic liquid, a cryogenic gas and a cryogenic solid.

In an alternative embodiment, a cryocooler is used and is thermally connected to a fuse casing. The cryocooler is used for removing heat from the fuse casing. It will be appreciated by the skilled addressee that the cryocooler cold head and compressor arrangement should include means of assuring voltage electrical isolation so as not to provide an alternate electrical path for nominal or fault currents. The fuse casing is surrounded by a cryogenic insulation material adapted for isolating the fuse casing from external temperature influences. Two electrical connections, each connected to one end of the fuse casing are used to provide an electrical connection with the fuse casing. Each of the electrical connections are optimized for low heat leaks.

In another alternative embodiment, the Peltier effect may be advantageously used. In such embodiment, the fuse casing is surrounded by a cryogenic insulation material. Each end of the fuse casing is connected to a corresponding Peltier module adapted for removing heat from the fuse casing. It will be appreciated that a pre-cooling regime may be required in such embodiment.

It will further be appreciated that while an ex-situ embodiment of a manufacturing method has been disclosed in FIG. 11, an in-situ method of manufacturing may be used to create a desired cryogenic current limiting fuse.

In such embodiment the desired current limiting fuse is created using a vertical layer by layer process. Each layer is created according to a desired result. more precisely, the result depends on the pattern of elements to insert to create the fuse. A substrate may be further used to secure the layers on a common element.

The embodiments of the invention described above are intended to be exemplary only. The scope of the invention is therefore intended to be limited solely by the scope of the appended claims.

We claim:

1. A current limiting fusible module, for use in a cryogenic fuse, said fusible module being adapted to initiate a current limiting arc, said fusible module comprising:
- a first cryogenic composite;
- a second cryogenic composite, adjacent to said first cryogenic composite; and
- a cryogenic heat dissipater secured to both the first cryogenic composite and the second cryogenic composite, said cryogenic heat dissipater adjacent each other and dissipating heat to thereby increase nominal operating current without significantly increasing peak fault current and let-through energy of said current fusible module wherein at least one of said first and said second cryogenic composites has a non-linear and substantially increasing resistivity with respect to increasing at least one of temperature and current, further wherein one of said first and second cryogenic composites having the highest resistance will depart from its solid state thereby initiating said current limiting arc.

2. The current limiting fusible module as claimed in claim 1, further comprising one of said first and second cryogenic composite having the highest resistance and two of the other cryogenic composite disposed on either side thereof.

3. The current limiting fusible module as claimed in claim 1, further comprising one of said first and second cryogenic composite having the highest resistance and two of the other cryogenic composite disposed on either side thereof.

4. A fusible element for use in a cryogenic fuse, said fusible element being adapted to initiate a current limiting arc, said fusible element comprising:

a plurality of a first cryogenic composite;

a plurality of a second cryogenic composite, each of said plurality of said second cryogenic composite being adjacent to one of said plurality of said first cryogenic composite to thereby create a plurality of current limiting fusible modules;

a plurality of cryogenic heat dissipaters, each of said plurality of cryogenic heat dissipaters being secured to one of said plurality of said first cryogenic composite and one of said plurality of said second cryogenic composite, each of said plurality of cryogenic heat dissipaters being adapted to dissipate heat to thereby increase nominal operating current without significantly increasing a peak fault current and a let-through energy of said fusible element; and wherein at least one of said first and said second cryogenic composites has a non-linear and substantially increasing resistivity with respect to increasing at least one of temperature and current, further wherein one of said first and second cryogenic composites having the highest resistance will depart from its solid state thereby initiating said current limiting arc.

5. The fusible element as claimed in claim 4, wherein said pluralities of first and second cryogenic composites form a series having two ends, wherein the one of said first and second cryogenic composite having the lowest resistance when said current limiting arc is initiated forms said ends.

6. The fusible element as claimed in claim 5, wherein at least two of said plurality of current limiting fusible modules are secured serially one to another according to a desired power nominal and fault voltage.

7. The fusible element as claimed in claim 5, wherein at least two current limiting fusible modules are secured in parallel in accordance with a desired power network nominal and fault current.

8. The fusible element as claimed in claim 4, wherein said pluralities of first and second cryogenic composites form a series having two ends, wherein the one of said first and second cryogenic composite having the lowest resistance when said current limiting arc is initiated forms said ends.

9. The fusible element as claimed in claim 4, wherein at least two of said plurality of current limiting fusible modules are secured serially one to another according to a desired power nominal and fault voltage.

10. The fusible element as claimed in claim 4, wherein at least two current limiting fusible modules are secured in parallel in accordance with a desired power network nominal and fault current.

11. A cryogenic fuse adapted to initiate a current limiting arc, said cryogenic fuse comprising:

a casing;

a plurality of a first cryogenic composite within said casing;

a plurality of a second cryogenic composite within said casing, each of said plurality of said second cryogenic composite being adjacent to one of said plurality of said first cryogenic composite to thereby create a plurality of current limiting fusible modules;

a cooling means within said casing, said cooling means surrounding said plurality of said first cryogenic composite and said plurality of said second cryogenic composite;

an arc-extinguishing medium, within said casing; and a plurality of cryogenic heat dissipaters, each of said plurality of cryogenic heat dissipaters being secured to at least one of said plurality of said first cryogenic composite and at least one of said plurality of said second cryogenic composite, each of said plurality of cryogenic heat dissipaters being adapted to dissipate heat to thereby increase nominal operating current without significantly increasing peak fault current and let-through energy of said fusible element;

wherein at least one of said first and said second cryogenic composites has a non-linear and substantially increasing resistivity with respect to increasing at least one of temperature and current, further wherein one of said first and second cryogenic composites having the highest resistance will depart from its solid state thereby initiating said current limiting arc.

12. The cryogenic fuse as claimed in claim 11, wherein said cooling means comprises a coolant liquid.

13. The cryogenic fuse as claimed in claim 12, wherein said coolant liquid comprises liquid nitrogen.

14. The cryogenic fuse as claimed in claim 11, wherein said cooling means comprises a cryocooler thermally connected to said plurality of said first cryogenic composite and said plurality of said second cryogenic composite, further wherein said casing comprises a cryogenic insulation material surrounding said plurality of said first cryogenic composite and said plurality of said second cryogenic composite.

15. The cryogenic fuse as claimed in claim 11, wherein said cooling means comprises at least one Peltier module thermally connected to said plurality of said first cryogenic composite and said plurality of said second cryogenic composite, further wherein said casing comprises a cryogenic insulation material surrounding said plurality of said first cryogenic composite and said plurality of said second cryogenic composite.

16. The cryogenic fuse as claimed in claim 11, wherein said cooling means comprises a coolant liquid.

17. The cryogenic fuse as claimed in claim 16, wherein said coolant liquid comprises liquid nitrogen.

18. The cryogenic fuse as claimed in claim 11, wherein said cooling means comprises a cryocooler thermally connected to said plurality of said first cryogenic composite and said plurality of said second cryogenic composite, further wherein said casing comprises a cryogenic insulation material surrounding said plurality of said first cryogenic composite and said plurality of said second cryogenic composite.

19. The cryogenic fuse as claimed in claim 11, wherein said cooling means comprises at least one Peltier module thermally connected to said plurality of said first cryogenic composite and said plurality of said second cryogenic composite, further wherein said casing comprises a cryogenic insulation material surrounding said plurality of said first cryogenic composite and said plurality of said second cryogenic composite.

20. A method for manufacturing a cryogenic fuse, comprising:

creating a plurality of current limiting fusible modules, each one of said plurality of current limiting fusible modules being adapted to initiate a current limiting arc, said current limiting fusible module comprising a first cryogenic composite and a second cryogenic composite adjacent to said first cryogenic composite, wherein at least one of said first and said second cryogenic composites has a non-linear and substantially increasing resistivity with respect to increasing at least one of temperature and current, further wherein one of said first and second cryogenic composites having the highest resistance will depart from its solid state thereby initiating said current limiting arc;

creating at least one fusible assembly by placing at least one of said plurality of current limiting fusible modules serially according to a desired power network nominal voltage;

creating a fusible element by assembling said at least one fusible assembly of said at least one fusible assembly in parallel according to a desired power network nominal current; and incorporating said fusible element in a casing comprising an arc-extinguishing medium and means for cryogenic cooling thereby creating said cryogenic fuse;

wherein said creating of said plurality of current limiting fusible modules further comprises securing a cryogenic heat dissipator to both said first cryogenic composite and said second cryogenic composite, said cryogenic heat dissipator dissipating heat to increase the nominal current and over-current characteristics without significantly increasing the peak limited current and let-through energy.

21. The method as claimed in claim 20, wherein said means for cryogenic cooling comprises at least one of a Peltier module and a cryocooler module.

22. The method as claimed in claim 20, wherein said creating of said plurality of current limiting fusible modules, said creating of said at least one fusible assembly and said creating of said fusible element are performed using a layer manufacturing technique.

23. The method as claimed in claim 22, wherein said creating of said plurality of current limiting fusible modules further comprises securing a cryogenic heat dissipater to both said first cryogenic composite and said second cryogenic composite, said cryogenic heat dissipater dissipating heat to increase the nominal current and over-current characteristics without significantly increasing the peak limited current and let-through energy.

24. The method as claimed in claim 23, wherein said means for cryogenic cooling comprises at least one of a Peltier module and a cryocooler module.

* * * * *